United States Patent
Nishikawa

(10) Patent No.: US 7,894,212 B2
(45) Date of Patent: Feb. 22, 2011

(54) SWITCHING POWER SUPPLY DEVICE

(75) Inventor: Yukihiro Nishikawa, Hino (JP)

(73) Assignee: Fuji Electric Systems Co., Ltd., Tokyo (JP)

(*) Notice: Subject to any disclaimer, the term of this patent is extended or adjusted under 35 U.S.C. 154(b) by 369 days.

(21) Appl. No.: 12/071,691

(22) Filed: Feb. 25, 2008

(65) Prior Publication Data
US 2008/0219033 A1    Sep. 11, 2008

(30) Foreign Application Priority Data
Mar. 9, 2007  (JP) .............................. 2007-059340

(51) Int. Cl.
H02M 3/335    (2006.01)
(52) U.S. Cl. .................. 363/16; 363/21.04; 363/21.15; 336/170; 336/182; 336/183
(58) Field of Classification Search .................. 363/16, 363/21.04, 21.07, 21.08, 21.09, 31.15, 21.16; 336/170, 182, 183
See application file for complete search history.

(56) References Cited

U.S. PATENT DOCUMENTS

| 5,909,363 | A  | * | 6/1999  | Yoon ........................ 363/21.16 |
| 6,130,824 | A  | * | 10/2000 | Hosotani ..................... 363/16 |
| 6,362,984 | B2 |   | 3/2002  | Gekinozu |
| 6,469,913 | B2 | * | 10/2002 | Hosotani et al. .............. 363/16 |
| 6,483,722 | B2 |   | 11/2002 | Nozawa et al. |
| 6,504,270 | B1 | * | 1/2003  | Matsushita .................. 307/140 |
| 6,917,528 | B2 |   | 7/2005  | Abe |

FOREIGN PATENT DOCUMENTS

| JP | 05-095680    | 4/1993 |
| JP | 11-206124    | 7/1999 |
| JP | 11-206724    | 7/1999 |
| JP | 2001-231258 A | 8/2001 |
| JP | 2002-209381 A | 7/2002 |
| JP | 2003-088117  | 3/2003 |
| JP | 2004-153948 A | 5/2004 |

* cited by examiner

Primary Examiner—Bao Q Vu
Assistant Examiner—Nguyen Tran
(74) Attorney, Agent, or Firm—Rabin & Berdo, P.C.

(57) ABSTRACT

A switching power supply device includes a first series circuit of first and second switching elements connected in parallel with a DC power supply. An isolation transformer has primary and secondary windings and first and second auxiliary windings, a first layer including the primary windings between a second layer of the two auxiliary windings, and a third layer of the secondary windings. A capacitor in series with the primary windings defines a second series circuit in parallel with the second switching element. A rectifying and smoothing circuit includes a rectifying diode and a smoothing capacitor, connected to the secondary windings. First and second control circuits turn on and off the first and second switching elements based on voltages generated in the two auxiliary windings, to obtain a DC output from the rectifying and smoothing circuit, enabling an adequate auxiliary windings voltage and stable switching operation including stable zero-voltage turn-on.

18 Claims, 18 Drawing Sheets

SWITCHING POWER SUPPLY DEVICE

BACKGROUND OF THE INVENTION

1. Field of the Invention

The invention relates to a switching power supply device, which controls on/off switching of a switching element based on a voltage occurring in auxiliary windings provided in an isolation transformer, and which obtains a DC output insulated from a DC power supply.

2. Description of the Related Art

FIG. 13 shows technology of the prior art for this type of switching power supply device, with a circuit configuration which is substantially the same as that of the switching power supply devices disclosed in Japanese Patent Laid-open No. 2001-231258, FIGS. 1 and 10 (corresponding to U.S. Pat. No. 6,362,984) and in Japanese Patent Laid-open No. 2002-209381, FIG. 1 (corresponding to U.S. Pat. No. 6,483,722). In this circuit, by alternately turning on and off the switching element Q1 and switching element Q2 based on the voltage appearing in two auxiliary windings P2, P3 provided in the isolation transformer T1, a resonance voltage is caused to appear in the primary windings P1 of the isolation transformer. As a result, the resonance voltages appearing in two secondary windings S1, S2 provided on the secondary side of the isolation transformer are full-wave rectified by rectifying and smoothing circuits D1, D2, Co with a center-tap configuration to obtain a constant DC output. In this circuit in FIG. 13, a resonance voltage is caused to appear in the primary windings P1, and the series resonance operation of the leakage inductance and resonance capacitance Cr of the isolation transformer T1 is utilized.

In this type of switching power supply device, when the two switching elements Q1 and Q2 are turned on, by applying a gate voltage with the timing at which current flows in each of the body diodes, zero-voltage turn-on is possible, and turn-on losses do not occur. Further, voltages of elements Q1 and Q2 occurring at turn-off are clamped by the DC power supply voltage Vin, so that there is almost no surge voltage, and a low-loss, low-noise power supply device easily can be realized.

FIG. 15 shows other prior art for this type of switching power supply device, namely a circuit configuration substantially the same as the switching power supply device disclosed in FIGS. 2, 4 and 5 of Japanese Patent Laid-open No. 2004-153948, (corresponding to U.S. Pat. No. 6,917,528) described below. A difference between the circuits of FIG. 15 and FIG. 13 is that the resonance voltage occurring in one set of secondary windings S1 on the secondary side of the isolation transformer is half-wave rectified by the rectifying and smoothing circuit D1 and Co to obtain a constant DC output. In the circuit of FIG. 13, energy is supplied to the smoothing capacitor Co both during intervals in which Q1 is on and during intervals in which Q2 is on, but in the circuit of FIG. 15 energy is stored in the exciting inductance of the isolation transformer T1 during intervals in which Q1 is on, and during intervals in which Q2 is on the stored excitation energy is supplied to the smoothing capacitor Co. The circuit of FIG. 15 has the characteristic that the secondary-side rectifying and smoothing circuit can be simplified.

In the circuit of FIG. 13, the illustrated conventional switching power supply device having a control circuit 1, gate driving circuit 2 (such as a resistor), detection/adjustment circuit 4 and control circuit 5, the leakage inductance of the isolation transformer T1 is used as the inductance component causing resonance with the resonance capacitor Cr. However, the peak of the current flowing in the switching element Q1 must be suppressed, and because the leakage inductance value is of the order of several hundred microHenries, the separated winding construction shown in FIG. 14 is employed to adjust the inductance to the required leakage inductance (see FIG. 10 of Japanese Patent Laid-open No. 2001-231258 (corresponding to U.S. Pat. No. 6,362,984)).

In the case of a separated winding construction, in order to secure an adequate isolation distance (spatial distance, creepage distance) between the primary windings P1 and secondary windings S1 and S2, a separate barrier 12 must be provided at the bobbin 10. Because the resulting structure is complex, there is the problem that costs are comparatively high.

In the circuit of FIG. 15 on the other hand, during intervals in which the switching element Q1 is on, the peak value of the current flowing in the switching element Q1 is suppressed by the exciting inductance of the isolation transformer. As a result, the leakage inductance value need only be of the order of several microHenries to several tens of microHenries, so that a stacked winding construction such as is shown in FIG. 16 is sufficient. Because a stacked winding construction is simple, costs can be reduced as compared with a separated-winding isolation transformer.

Below, steady-state operation of the circuit of FIG. 15 is explained using the waveform diagram of FIG. 17. In FIG. 17, VQ1 and IQ1 are the voltage and current of switching element Q1, VQ2 and IQ2 are the voltage and current of switching element Q2, ID1 is the current of rectifying diode D1, and Im is the exciting current of isolation transformer T1.

Interval t4 to t1

In this interval, excitation energy is stored in the excitation inductance of the isolation transformer T1. IQ1 and Im have the same waveform. During the interval in which the body diode of the switching element Q1 is conducting and IQ1 is negative, when a gate voltage is applied to switching element Q1, switching element Q1 is turned on at zero voltage, and no turn-on loss occurs.

Interval t1 to t2

The switching element Q1 is turned off, and the excitation current is divided and flows to the parasitic capacitance (output capacitance), not shown, of switching elements Q1 and Q2. As a result, VQ1 rises and VQ2 falls, as shown in the figure.

Interval t2 to tr1

During the interval when VQ1 reaches the DC power supply voltage Vin and VQ2 reaches zero, the body diode of the switching element Q2 becomes conducting and IQ2 is negative. Moreover, when a gate voltage is applied to switching element Q2 the switching element Q2 is turned on at zero voltage, and no turn-on losses occur. The resonance current of the resonance capacitor Cr and the leakage inductance of the isolation transformer T1 flows in the switching element Q2. At the same time, a resonance current also flows in the rectifying diode D1, and energy is supplied to the smoothing capacitor Co.

Interval tr1 to t3

When the current of rectifying diode D1 goes to zero, the rectifying diode D1 undergoes reverse recovery and is turned off. The resonance current that had been flowing in the switching element Q2 also goes to zero, and IQ2 has the same waveform as Im. The rate of decrease of current when the rectifying diode D1 undergoes reverse recovery becomes more gentle with resonance operation, and the reverse recovery loss is slight.

Interval t3 to t4

When the switching element Q2 is turned off, the excitation current is divided and flows to the parasitic capacitance (output capacitance), not shown, of switching element Q1 and switching element Q2. As a result, VQ2 rises and VQ1 falls.

As explained above, in steady-state operation Q1 and Q2 are turned on at zero voltage during turn-on, so that low-loss, low-noise switching operation can be continued.

However, there exist switching power supply loads, which are switching loads that repeatedly alternate between light loads and heavy loads. An example of this is the backlight inverter or the like that drives cold cathode tubes used in the backlights of liquid crystal televisions and the like. Because cold cathode tubes cannot adjust the light emission intensity (brightness) through an applied voltage, the ratio of light emission intervals to extinction intervals is adjusted to control the brightness, and so a switched load results.

In the case of the circuit of FIG. 15, in order to suppress the drop in output voltage when the load increases rapidly, the resonance current must be increased rapidly; but at this time the switching element Q2 may turn off before the current flowing in the rectifying diode D1 reaches zero. Below, the waveform diagram of FIG. 18 is used to explain the problem that arises when an isolation transformer with the general winding construction shown in FIG. 16 is applied. In FIG. 16, the transformer has a winding construction in which primary windings P1, secondary windings S1, and auxiliary windings P2 and P3 are wound, in this order, on the bobbin 11.

Referring to FIG. 18, VGS2 is the gate voltage of switching element Q2. VP1, VP3 and VS1 are respectively the primary winding (P1) voltage, the voltage of the auxiliary windings (P3) that turn on and off the switching element Q1, and the secondary windings (S1) voltage of the isolation transformer T1. ID1 is the current in rectifying diode D1. VQ1, IQ1, and VGS1 are respectively the voltage, current, and gate voltage of the switching element Q1. Also, Vth is a threshold voltage for turning on and off the switching element Q1, based on the voltage appearing in the auxiliary windings P3.

In the case of the winding construction of FIG. 16, the auxiliary windings P3 are wound above the secondary windings S1. As a result, the degree of coupling with the primary windings P1 is weak, and the degree of coupling with the secondary windings S1 is strong. Hence, the voltage of the auxiliary windings P3 is substantially similar to the voltage of the secondary windings S1.

When the switching element Q2 turns off at time t3, VQ1 falls. The VQ1 voltage waveform falls due to resonance action between the excitation inductance of the isolation transformer and the combined capacitance of the output capacitances, not shown, of the switching elements Q1 and Q2. On the other hand, the voltage VP3 of the auxiliary windings P3 does not change until reverse recovery of the rectifying diode D1 at time tr2, and even when VQ1 begins to rise again due to resonance action, the switching element Q1 cannot be turned on.

When such action occurs, the switching element Q1 does not turn on at zero voltage. As a result, turn-on losses occur, and the efficiency of the switching power supply device is reduced. Alternatively, the switching operation may become unstable, and unpleasant sounds may be emitted from the isolation transformer.

Next, a separate problem is explained. When using a power supply startup method in which a resistance connected to the DC power supply causes the gate voltage of the switching element Q1 to be raised, providing an opportunity for the switching element Q1 to turn on, the auxiliary windings voltage undergoes high-frequency oscillation near the threshold of the switching element Q1. As a result, there are cases in which an adequate output voltage is not generated and startup fails. This is illustrated in FIGS. 2, 4, and 5 of Japanese Patent Laid-open No. 2004-153948 (corresponding to U.S. Pat. No. 6,917,528), Hence an object of this invention is to provide an inexpensive switching power supply device which, even in a mode in which the switching element Q2 turns off before the current flowing in the rectifying diode becomes zero, turns on at zero voltage and prevents a decline in the efficiency of the switching power supply device Such a device also should stably continue switching operation and eliminate unpleasant sounds from the isolation transformer. Startup failures should not occur.

SUMMARY OF THE INVENTION

In order to attain the above object, a switching power supply device a series circuit of a first switching element and a second switching element connected in parallel with a DC power supply is provided. A series circuit of a capacitor and primary windings of an isolation transformer is connected in parallel with the second switching element. A rectifying and smoothing circuit, including a rectifying diode and a smoothing capacitor, is connected to secondary windings of the isolation transformer. First and second auxiliary windings are provided to the isolation transformer. A first control circuit is configured to execute control to turn on and off the first switching element based on a voltage generated in the first auxiliary windings. A second control circuit is configured to execute control to turn on and off the second switching element based on a voltage generated in the second auxiliary windings. The first and second switching elements turn on and off alternately, and this results in a DC output from the rectifying and smoothing circuit. The isolation transformer has a configuration in which a wound layer including the primary windings is provided between a layer including the first and second auxiliary windings, and a layer including the secondary windings. In accordance with this invention, when the load increases rapidly and at other times, even when in a mode in which the second switching element turns off before the current flowing in the rectifying diode becomes zero, the first switching element can be turned on at zero voltage. Thus, a switching power supply device that operates stably with low loss and low noise can be provided. Further, an inexpensive switching power supply device can be provided in which a stacked-winding isolation transformer can be used.

According to another aspect of the invention, the first control circuit includes a feedback circuit that provides feedback to execute control such that the DC output voltage is constant. The first control circuit also includes a triangular wave generating circuit, a voltage polarity detector configured to detect polarity of a voltage generated in the first auxiliary windings, a first gate driving circuit configured to turn on and off the first switching element, and a startup pulse generation circuit. The first gate driving circuit causes the first switching element to turn on after a prescribed delay time from the time that the voltage generated in the first auxiliary windings changes from negative to positive. The first gate driving circuit also causes the first switching element to turn off at the earlier time as between the time when an output signal value of the triangular wave generation circuit exceeds a feedback signal value output from the feedback circuit and the time when the voltage generated in the first auxiliary windings changes from positive to negative.

According to a further aspect of the invention, the second control circuit includes a second gate driving circuit configured to turn on and off the second switching element and a time constant circuit that sets the maximum on time of the second switching circuit. The second gate driving circuit causes the second switching element to turn on after a prescribed delay time from the time when the second auxiliary windings voltage changes from negative to positive. It causes the second switching element to turn off at the earlier of the time when the second auxiliary windings voltage switches from positive to negative, and the time after the maximum on time of the second switching element has elapsed, whereby startup failures and simultaneous turning-on of switching elements are avoided.

According to a still further aspect of the invention, the maximum on time and an excitation inductance value of the isolation transformer are set such that, when a load connected to the DC output is a light load, the second switching element turns off after the current flowing in the rectifying diode becomes zero, and when the load is a heavy load, the second switching element turns off before the current flowing in the rectifying diode becomes zero. Thus, by appropriately setting the excitation inductance of the isolation transformer and the maximum on time of the second switching element, a high-efficiency switching power supply device can be provided.

According to another aspect of the invention, the voltage generated in the first auxiliary windings of the isolation transformer is rectified and smoothed, and used as the control power supply of the first control circuit. According to still another aspect, the third auxiliary windings are provided in the isolation transformer, a construction is employed in which the wound layer including the secondary windings is provided between the layer including the primary windings and the layer including the third auxiliary windings, and the voltage generated in the third auxiliary windings is rectified and smoothed and is used as the control power supply of the first control circuit. Thus, by rectifying and smoothing the voltage appearing in auxiliary windings to obtain a control power supply, reduced costs through simplification of the control power supply can be achieved.

BRIEF DESCRIPTION OF THE DRAWINGS

These and other aspects of the invention will be better understand from the following detailed description of preferred embodiments, with reference to the accompanying drawings in which.

DESCRIPTION OF THE PREFERRED EMBODIMENTS

Figure 1:
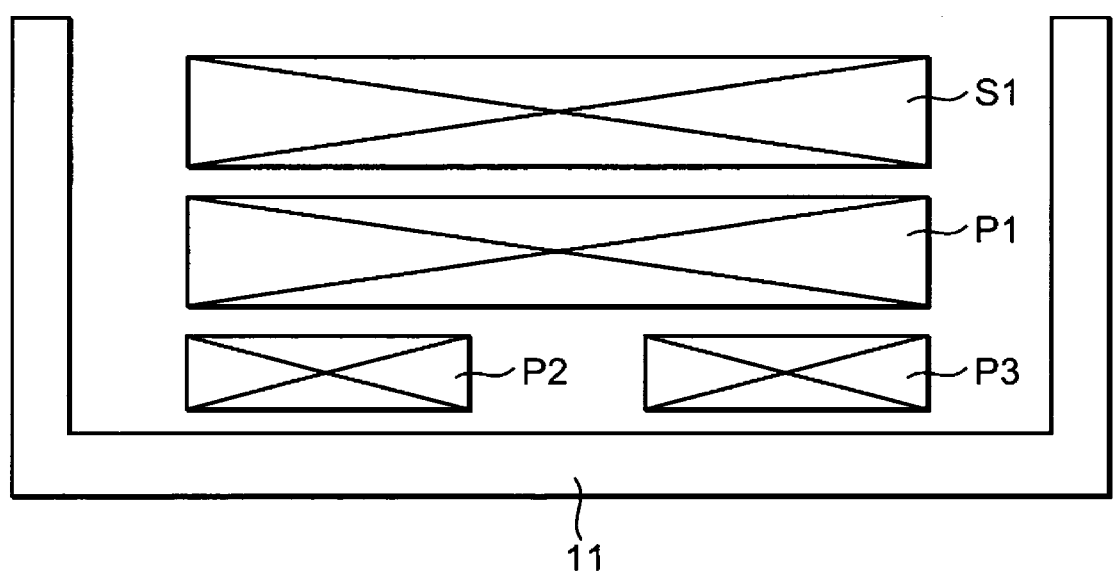
FIG. 1 shows the construction of the winding of an isolation transformer, according to an aspect of the invention.

FIG. 1 shows the winding construction of an isolation transformer, representing a first aspect of the invention. In the winding construction of FIG. 1, a layer including primary windings P1 is wound between a layer including auxiliary windings P2 and P3, and a layer including secondary windings S1; by strengthening the degree of coupling of the auxiliary windings P2, P3 with the primary windings P1 and weakening the degree of coupling with the secondary windings Sl, the voltages appearing in the auxiliary windings P2, P3 can be made substantially similar to the voltage appearing in the primary windings P1.

Figure 2:
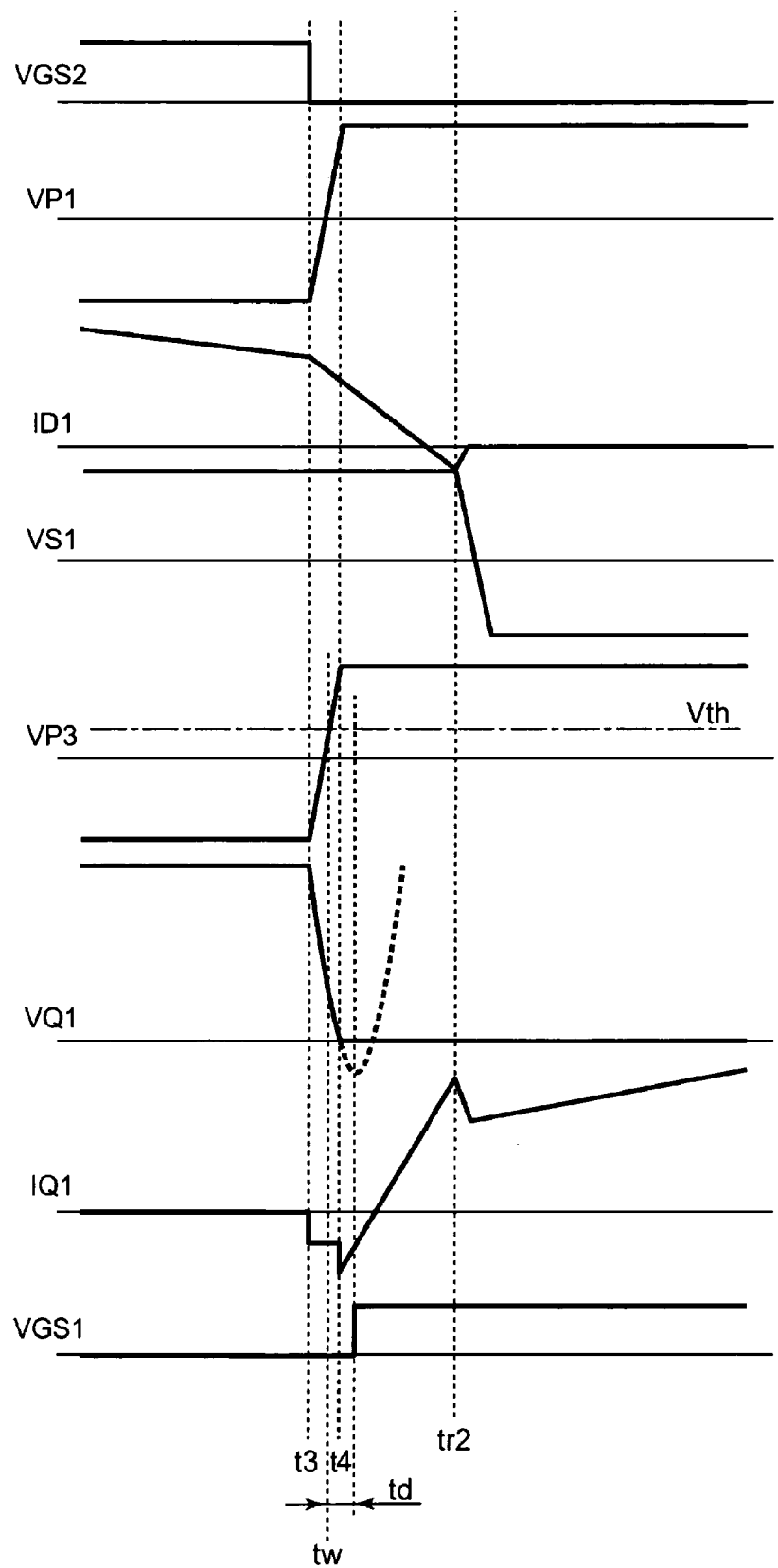
FIG. 2 is a waveform diagram illustrating an advantageous result of the winding construction of FIG. 1.
Figure 15:
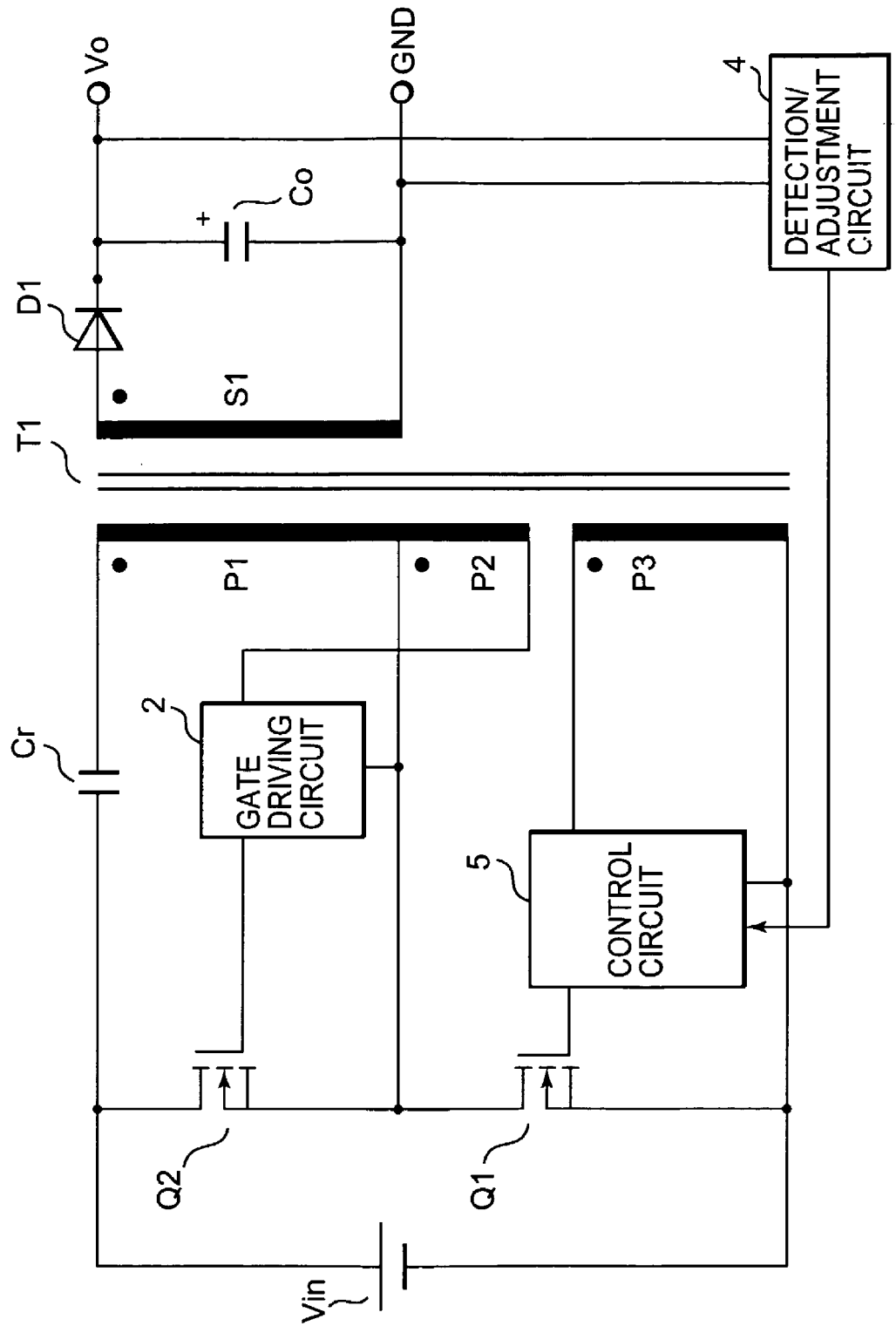
FIG. 15 is a circuit diagram showing a second aspect of the prior art.

Below, the waveform diagram of FIG. 2 is used to explain operation when an isolation transformer with the construction of FIG. 1 is applied to the circuit of FIG. 15.

At time t3, with current flowing in the rectifying diode D1, when the switching element Q2 turns off, VQ2 rises and VQ1 falls. The primary windings voltage VP1 is inverted from negative to positive. The voltage VP3 across the auxiliary windings P3 is substantially similar to the primary windings voltage VP1, and so similarly is inverted from negative to positive. The current that had been flowing in the rectifying diode D1 begins to decrease.

When the voltage VP3 of the auxiliary windings P3 exceeds the threshold Vth, the gate voltage VGS1 is applied after a delay time td, and turn-on occurs at zero voltage. At time tr2 the rectifying diode D1 undergoes reverse recovery, and the secondary windings voltage VS1 is inverted from positive to negative. A difference with the prior art is that the time at which the voltage VP3 of the auxiliary windings P3 is inverted is earlier than the time t3 of reverse recovery of the rectifying diode. Hence even when the switching element Q2 turns off while current is flowing in the rectifying diode D1, the switching element Q1 turns on at zero voltage, and so stable switching operation can be continued with low loss and low noise.

Figure 3:
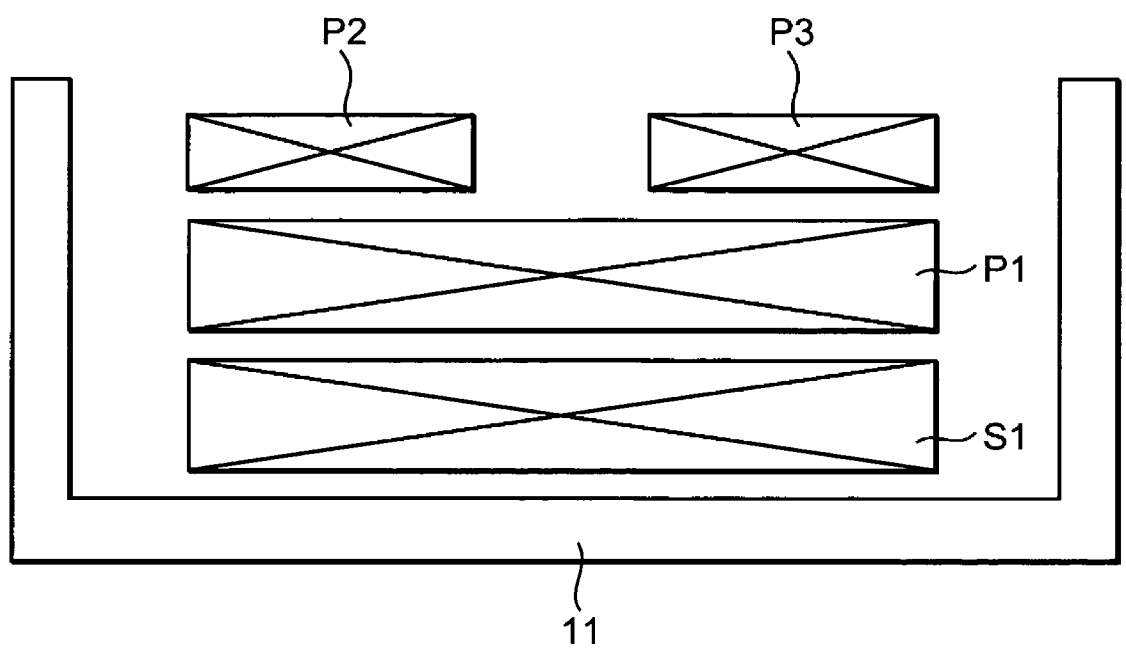
FIG. 3 is a diagram of the construction of the winding of an isolation transformer, according a modification of the winding construction of FIG. 1.

FIG. 3 shows a modified example of FIG. 1. A difference with the isolation transformer embodiment shown in FIG. 1 is that the positions of the layer including auxiliary windings P2 and P3 and the layer including the secondary windings are reversed; the advantageous results are similar to those of the winding construction of FIG. 1, and an explanation is omitted.

Figure 4:
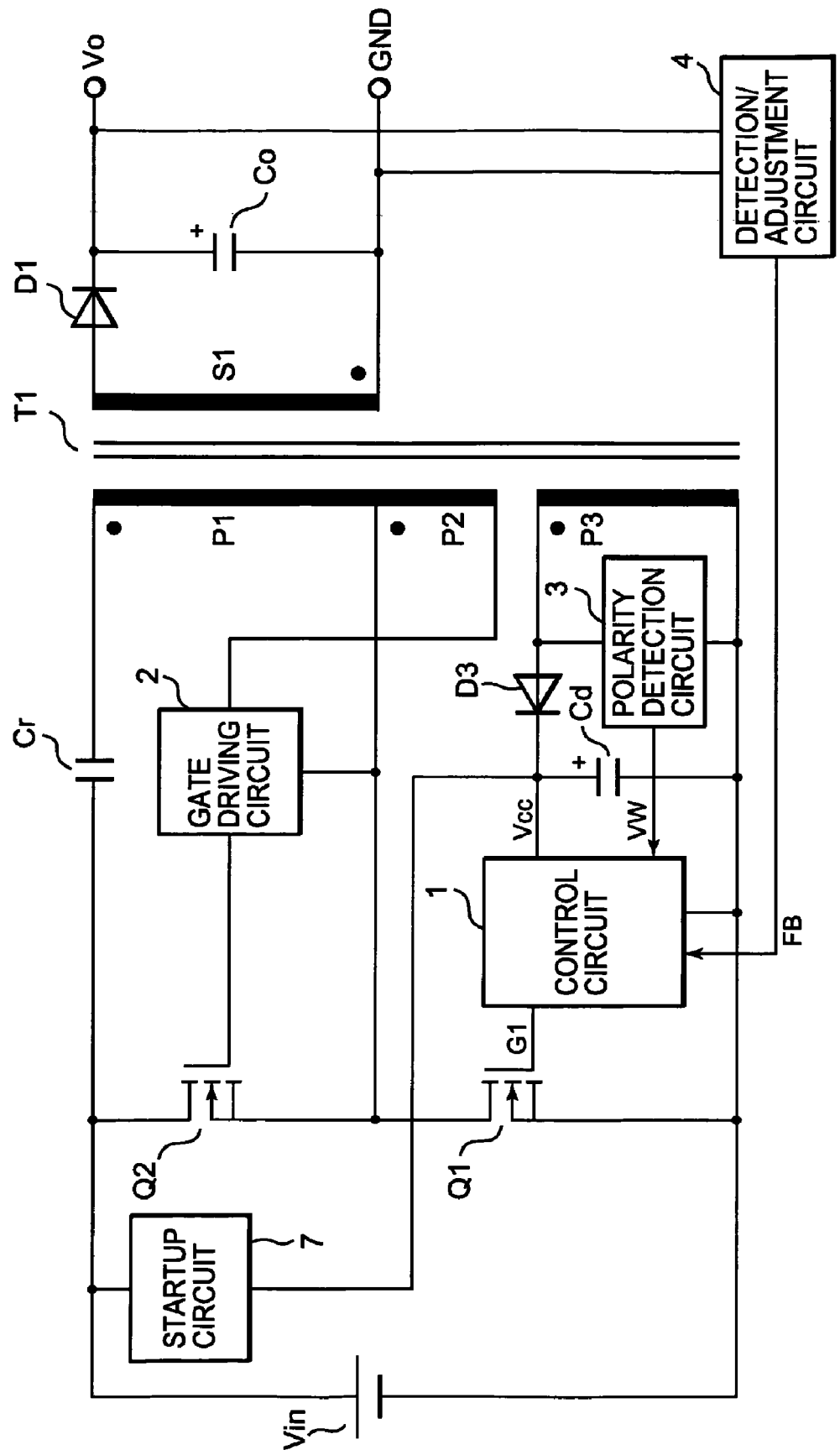
FIG. 4 is a circuit diagram showing another aspect of the invention.
Figure 5:
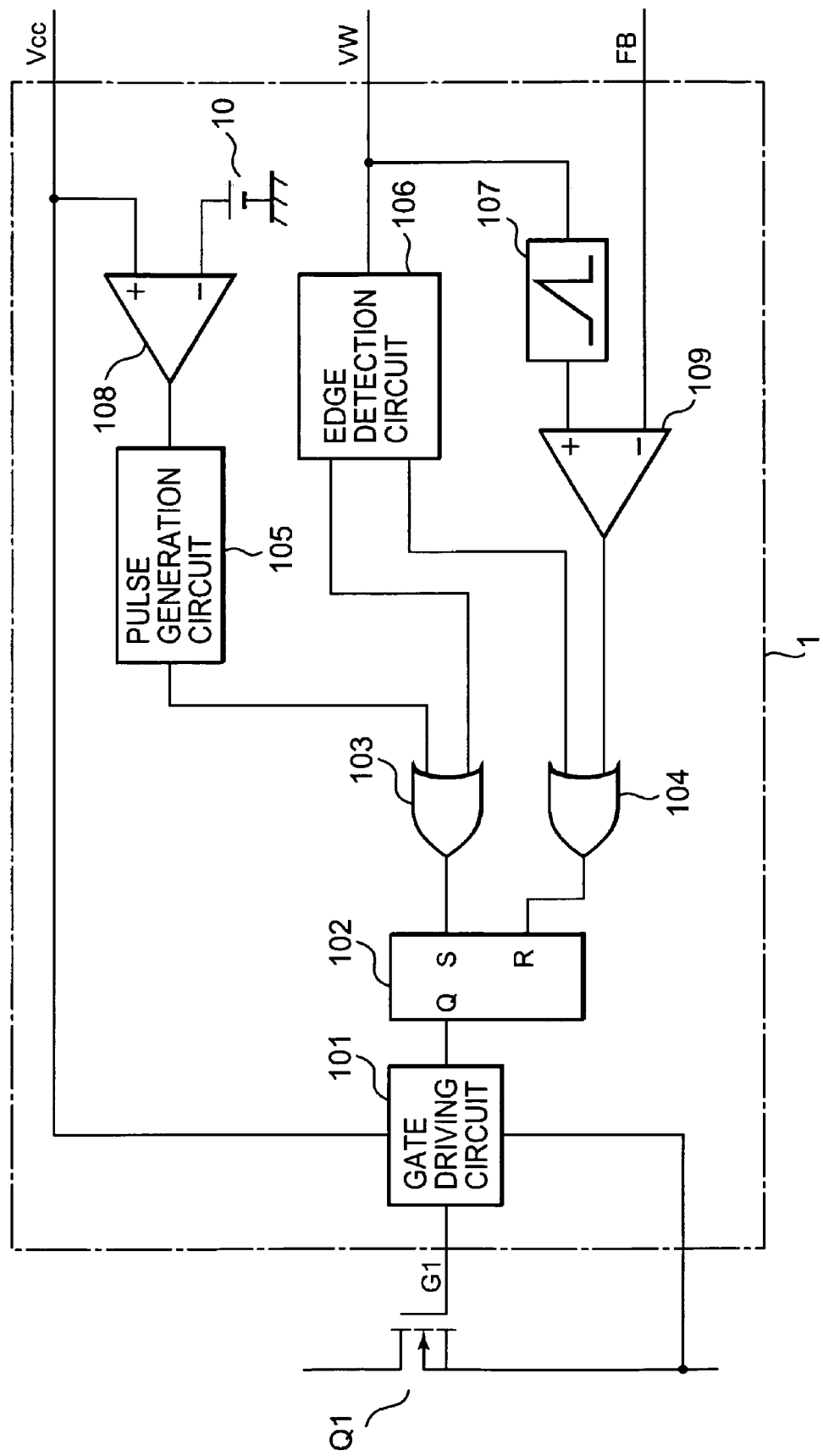
FIG. 5 is a circuit diagram showing a specific example of the control circuit 1 of FIG. 4.

FIG. 4 shows a circuit diagram representing an aspect of the invention. FIG. 5 shows a specific example of the control circuit 1 of FIG. 4, and FIG. 6 shows a specific example of the gate driving circuit 2 of FIG. 4.

As shown in FIG. 5, the control circuit 1 of FIG. 4 includes first gate driving circuit 101 to turn on and off the switching element Q1, a flip-flop circuit 102, startup pulse generation circuit 105, a rising/falling edge detection circuit 106, triangular wave generation circuit 107, comparators 108 and 109, and similar.

As control means, a simple resistance may also be used as the second gate driving circuit 2. However, by configuring the gate driving circuit 2 shown in FIG. 6, the voltage applied to the gate of switching element Q2 is zero or higher, and the gate can be protected from negative gate overvoltages.

Figure 6:
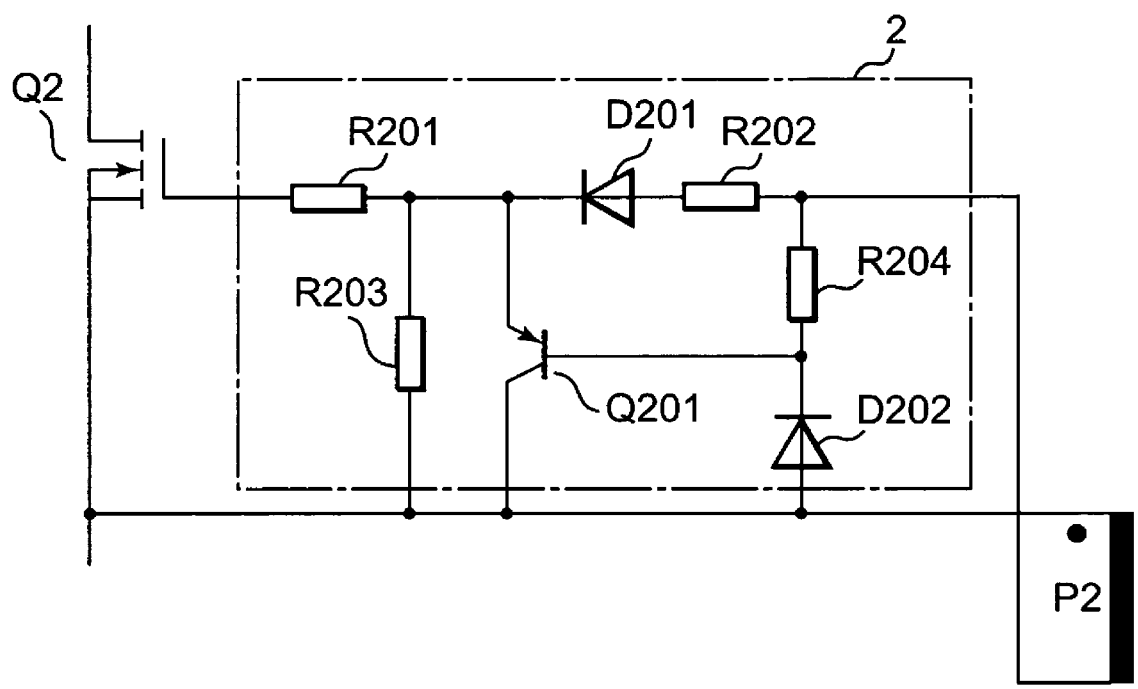
FIG. 6 is a circuit diagram showing a specific example of the driving circuit 2 of FIG. 4.

That is, when the voltage appearing in the auxiliary windings P2 is negative, the diode D201 in FIG. 6 is reverse-biased, and a negative voltage is not applied to the gate of switching element Q2. Because the transistor Q201 is off during the interval in which the voltage across auxiliary windings P2 is rising, and is on during the interval in which the voltage across auxiliary windings P2 is falling, the transistor operates such that the waveform is substantially the same as the positive voltage of the auxiliary windings P2. The voltage polarity detection circuit 3 compares the voltage appearing in the auxiliary windings P3 with the threshold voltage Vth, and determines the timing with which switching element Q1 is turned on.

When the switching element Q1 turns on, a voltage is applied to the primary windings P1 of the isolation transformer T1 from the DC power supply Vin via the resonance capacitor Cr, and energy is stored in the excitation inductance. At this time, the voltage waveform of the primary windings P1 is a portion of the resonance waveform determined by the resonance period Tm of the resonance capacitor and the excitation inductance of the isolation transformer. In steady-state operation, the frequency of the resonance waveform is set so as to be sufficiently lower than the switching frequency of Q1 and Q2.

In steady-state operation, the time at which the switching element Q1 turns off is adjusted so as to be the time at which, when the magnitudes of the output signal voltage of the output voltage detection/adjustment circuit 4, which is a feedback means, and of the output signal voltage of the triangular wave generation circuit 107 are compared, the output signal voltage of the triangular wave generation circuit 107 exceeds the output signal voltage of the output voltage detection/adjustment circuit 4.

However, in transient operation such as during startup of the switching power supply or during load fluctuation, there may be cases in which the on-time of the switching element Q1 increases rapidly to stabilize the output voltage, and the on-time of the switching element Q1 becomes equal to or greater than half of the resonance period Tm. At such times, if the windings of the transformer are as shown in FIG. 1 and FIG. 3, the voltages appearing in the auxiliary windings P2, P3 are substantially similar to the voltage in the primary windings P1, and the voltage polarities are each inverted between positive and negative.

Hence when the on-time of the switching element Q1 becomes equal to or greater than half the resonance period Tm, the voltage in the auxiliary windings P3 is inverted from positive to negative, the voltage in the auxiliary windings P2 is simultaneously inverted from negative to positive and the switching element Q2 turns on, so that switching elements Q1 and Q2 are on simultaneously, and a large short through current may flow.

In the control circuit of FIG. 5, the fact that the voltage of the auxiliary windings P3 is inverted from positive to negative before the output signal voltage of the triangular wave generation circuit 107 reaches the output signal voltage of the output voltage detection/adjustment circuit 4 is detected by the rising/falling edge detection circuit 106, the flip-flop circuit 102 is reset, the switching element Q1 is forced off by the gate driving circuit 101, and the switching elements Q1 and Q2 can be prevented from being turned on simultaneously.

Further, the startup pulse generation circuit 105 detects the fact that, after input from the DC power supply Vin, the power supply voltage of the control circuit 1 reaches a sufficiently higher voltage than the gate threshold voltage of the switching element Q1, and by means of the startup circuit 7 connected between the DC power supply Vin and the power supply Vcc of control circuit 1, an adequate driving pulse is applied to the switching element Q1, so that stabilized power supply startup operation is possible, without the occurrence of startup failure.

Figure 7:
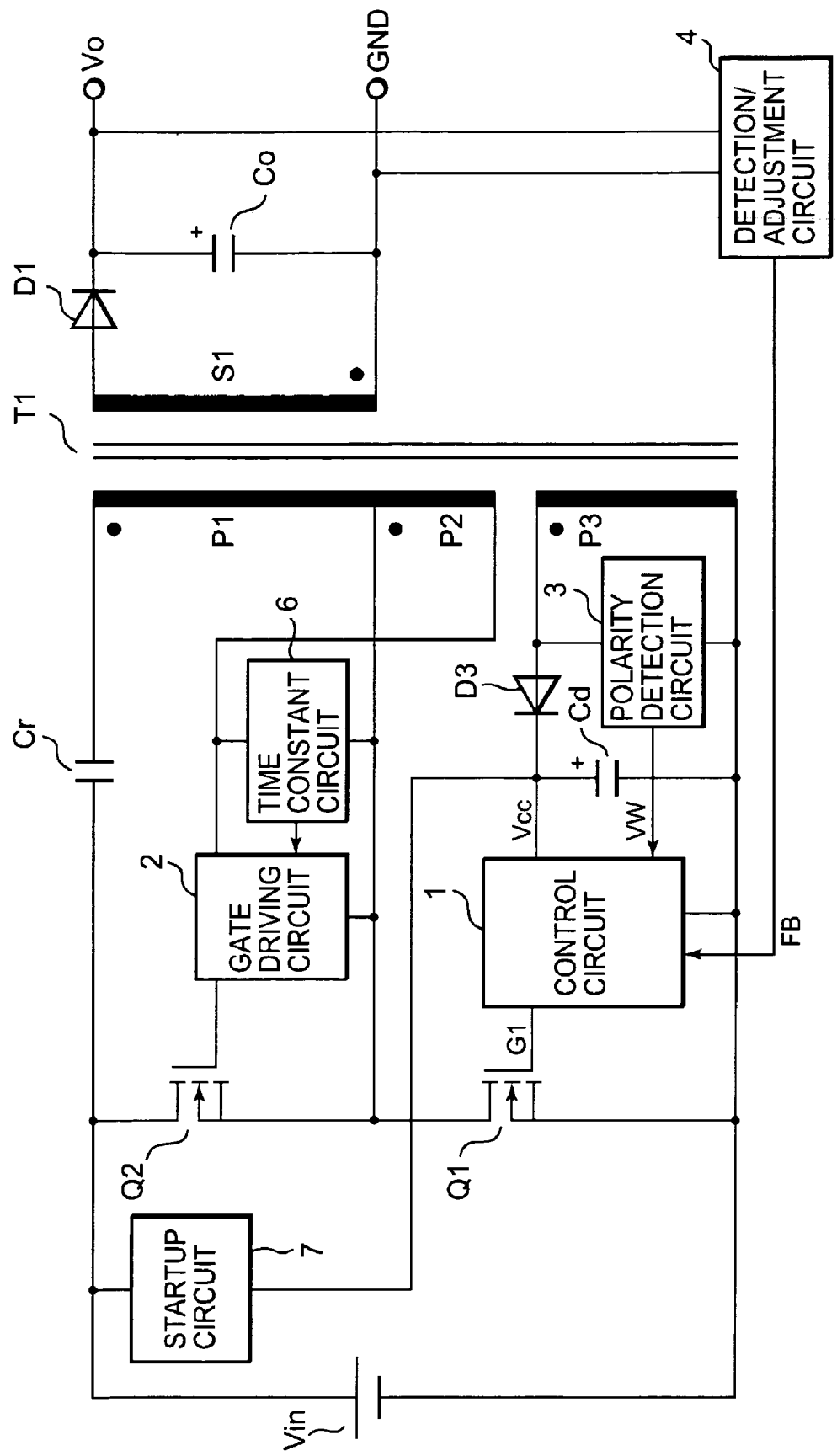
FIG. 7 is a circuit diagram showing still another aspect of the invention.
Figure 8:
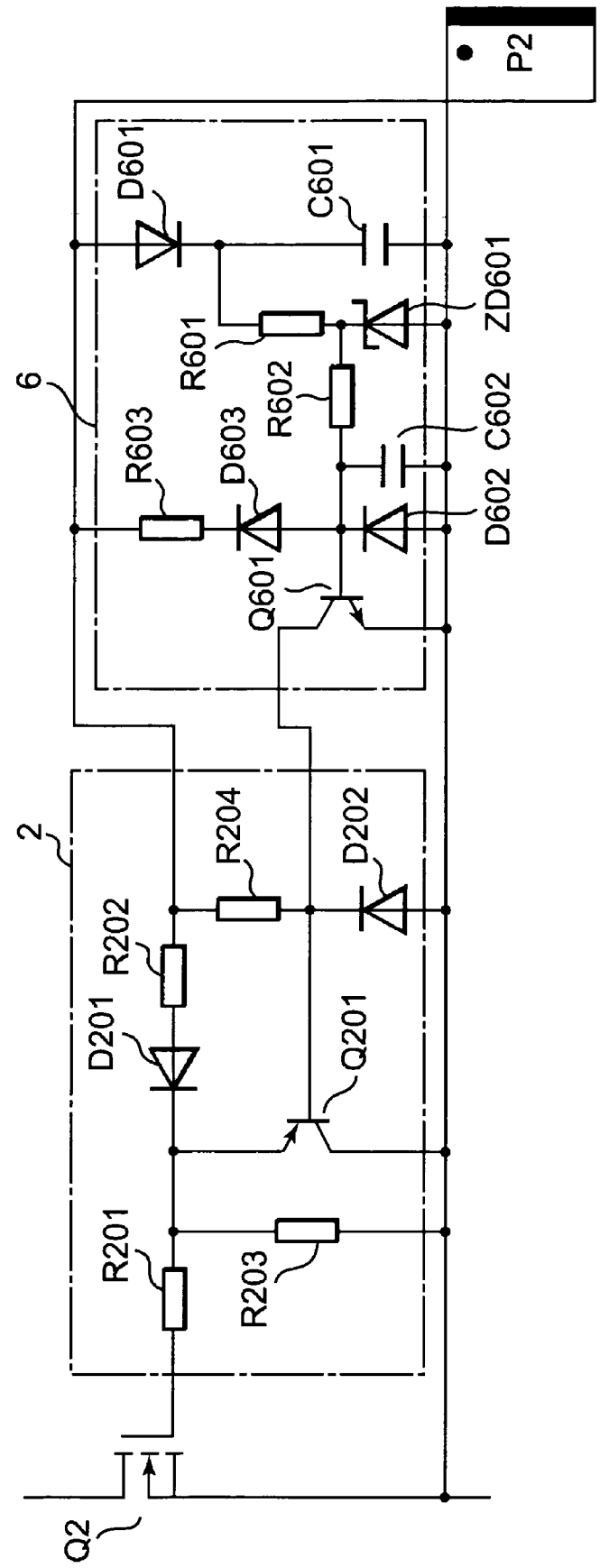
FIG. 8 is a circuit diagram showing a specific example of the time constant circuit 2 of FIG. 7.

Next, another aspect of the invention is explained, referring to the circuit diagram of FIG. 7. FIG. 8 shows a specific example of a time constant circuit 6 that sets the maximum on time of the switching element Q2. The time constant circuit 6 is connected to the gate driving circuit 2, and after the preset time has elapsed, the switching element Q2 is turned off by the gate driving circuit 2.

Below, operation is explained for cases in which the interval in which the voltage of the auxiliary windings P2 is positive is longer than the time set by the time constant circuit 6.

The time constant circuit 6 performs half-wave rectification of the voltage VP2 of the auxiliary windings P2 using the diode D601 and capacitor C601, and through the resistance R601 and Zener diode ZD601 obtains a stabilized power supply. During the interval in which the switching element Q1 is on, the voltage in the auxiliary windings P2 is negative, and current flows in the path of the diode D602, diode D603, resistance R603, and auxiliary windings P2, and the voltage across the capacitor C602 has the value of the forward-direction voltage drop (−VF) across the diode D602. At this time, transistor Q601 is turned off.

Next, when switching element Q1 turns off and the voltage in the auxiliary windings P2 is inverted from negative to positive, diode D603 turns off. The capacitor C602 is charged by the above stabilized power supply via resistance R602, and the voltage gradually rises from −VF, and upon reaching the base-emitter voltage VBE of the transistor Q601, transistor Q601 turns on. The collector of transistor Q601 is connected to the base of transistor Q201 of the gate driving circuit 2, and when transistor Q601 turns on, transistor Q201 turns on, the gate voltage of switching element Q2 is drawn down, and switching element Q2 is caused to turn off. As a result, the voltage in auxiliary windings P2 is inverted from positive to negative, capacitor C602 is discharged via diode D603 and resistance R603, and the voltage becomes −VF. That is, the time at which switching element Q2 turns on is the time in which the voltage of capacitor C602 changes from −VF to VBE.

Next, operation is explained for a case in which the time for the voltage in the auxiliary windings P2 to become positive is shorter than the time set in the time constant circuit 6.

In this case, the charging of capacitor C602 from −VF is the same as described above, but before the voltage across capacitor C602 reaches VBE, the voltage in the auxiliary windings P2 is inverted from positive to negative, and the voltage on capacitor C602 is discharged until −VF is reached. Hence switching elements Q1 and Q2 are not on simultaneously.

Further, by setting the maximum on time appropriately in the time constant circuit 6, the time ratio of the interval in which the rectifying diode D1 is on and the time over which it is off can be increased, and rectifying circuit losses due to decreases in the effective current value can be reduced.

Figure 9:
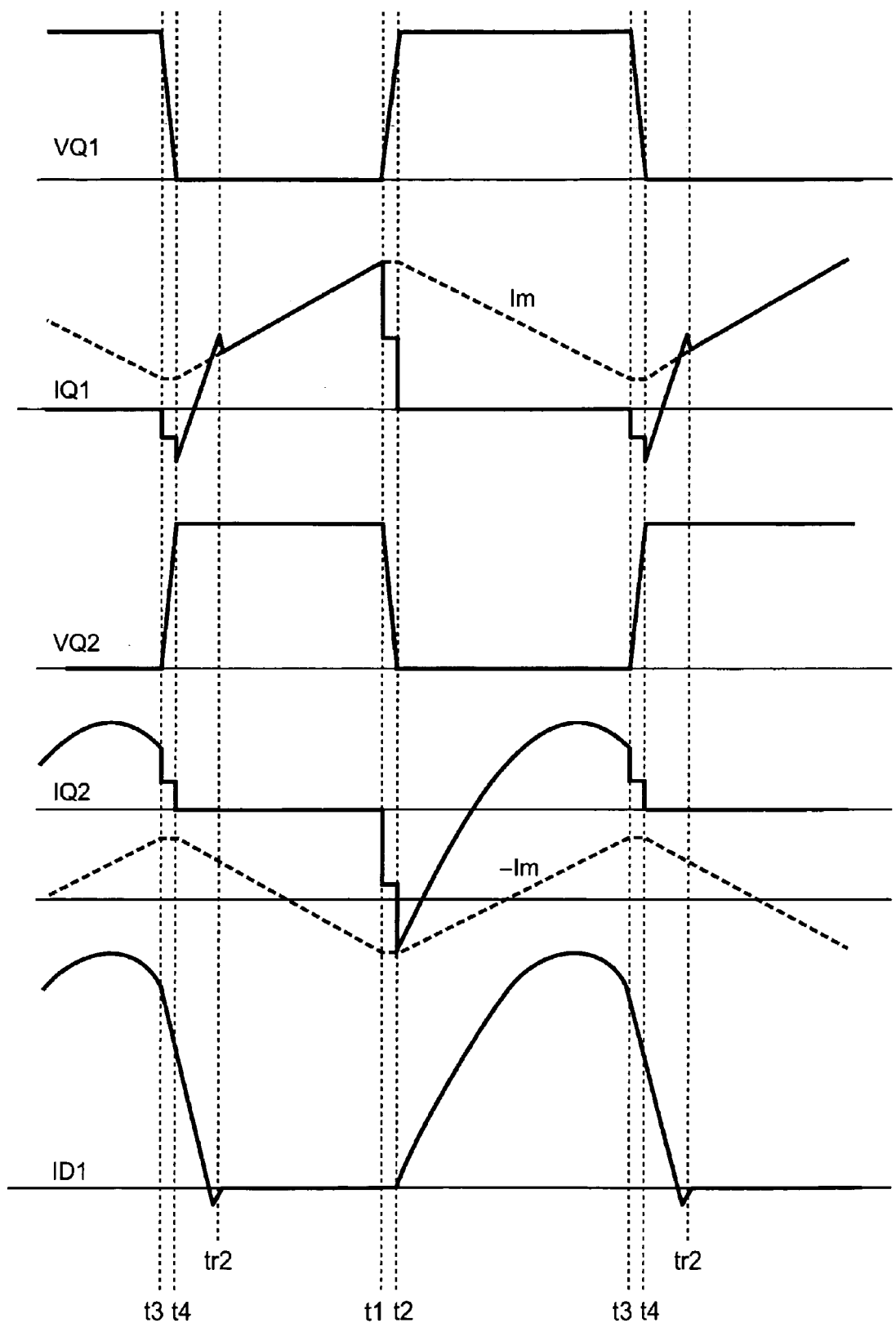
FIG. 9 is a waveform diagram which illustrates another aspect of the invention.

Next, a further aspect of the invention is explained, referring to FIG. 9.

According to the invention of Claim 1, even when the switching element Q2 turns off before the current flowing in rectifying diode D1 goes to zero, when switching element Q1 is on, turn-on occurs at zero voltage, and stable switching operation can be continued. Hence the maximum on time set in the time constant circuit 6 and the excitation inductance value of the isolation transformer T1 can be set such that, when the load connected to the DC output is a light load, the switching element Q2 turns off after the current flowing in rectifying diode D1 becomes zero, and when the load is a heavy load, the switching element Q2 turns off before the current flowing in rectifying diode D1 becomes zero.

Figure 16:
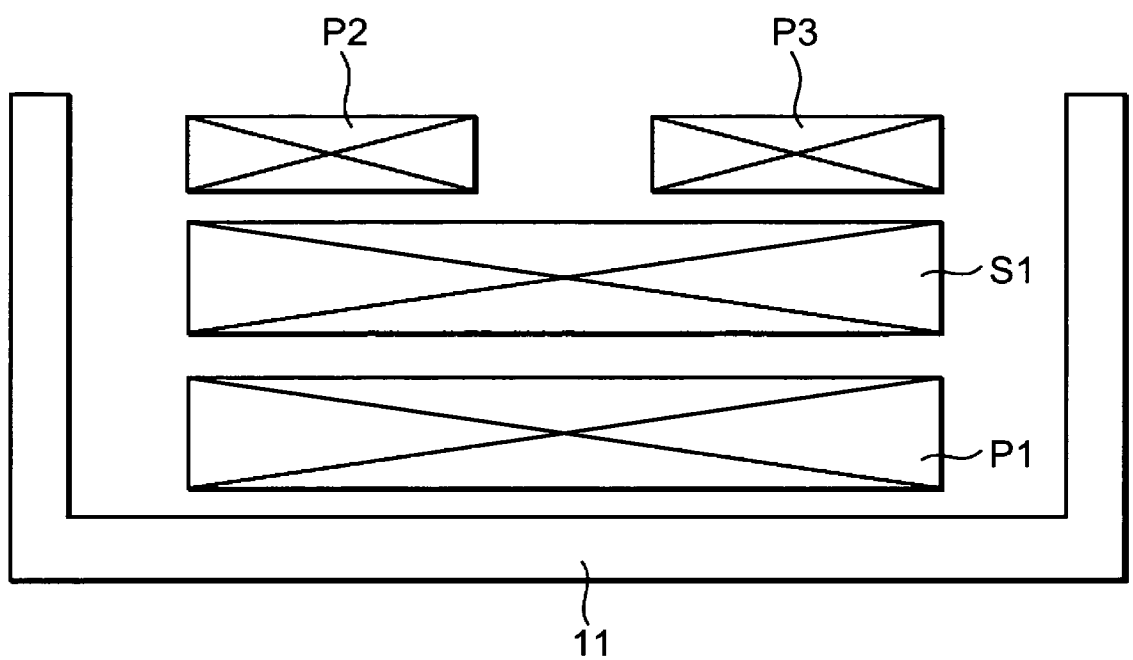
FIG. 16 is a winding construction diagram of an isolation transformer of the prior art, applied to the circuit of FIG. 15.
Figure 17:
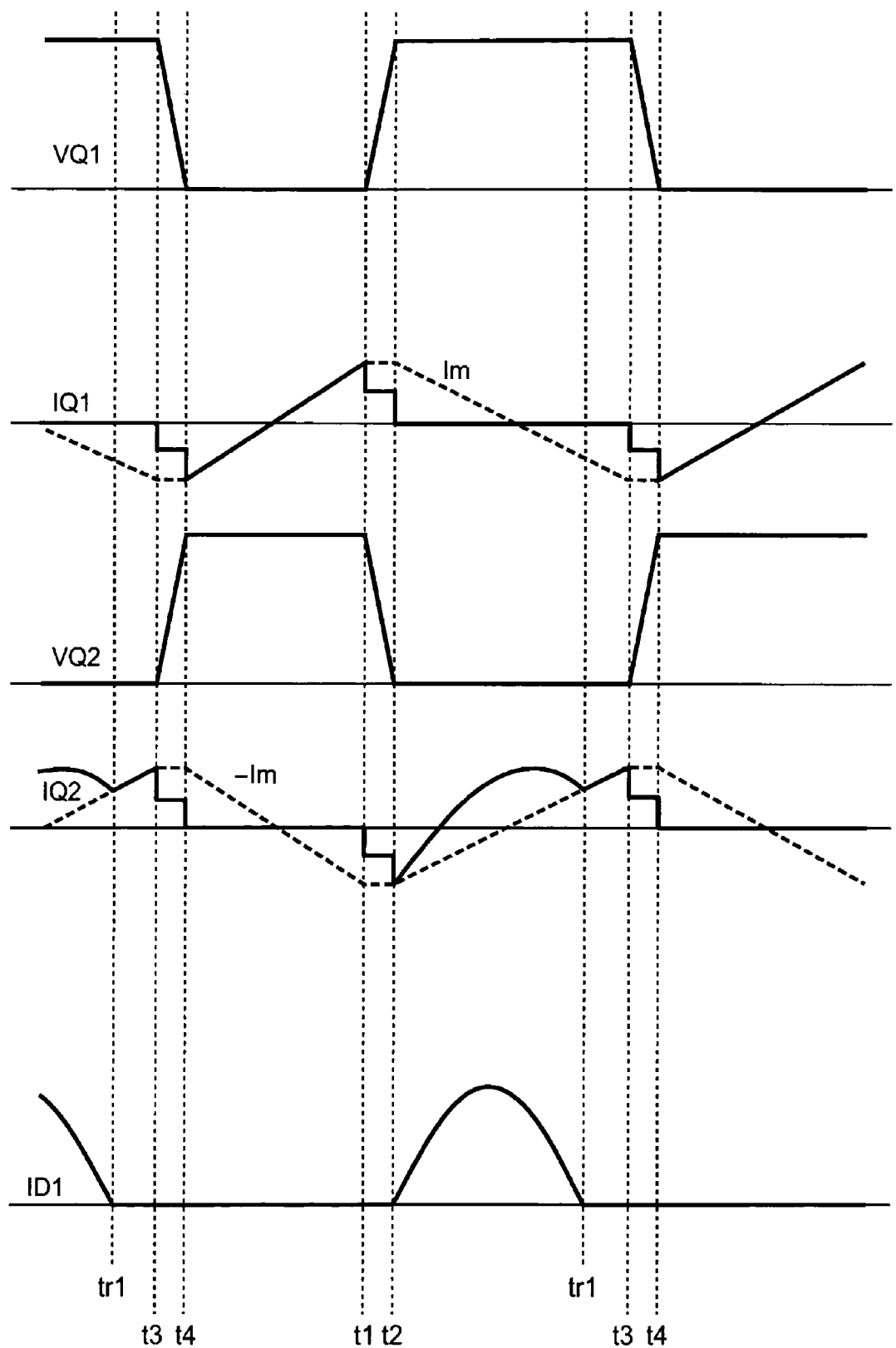
FIG. 17 is a waveform diagram which explains operation of the circuit of FIG. 15.
Figure 18:
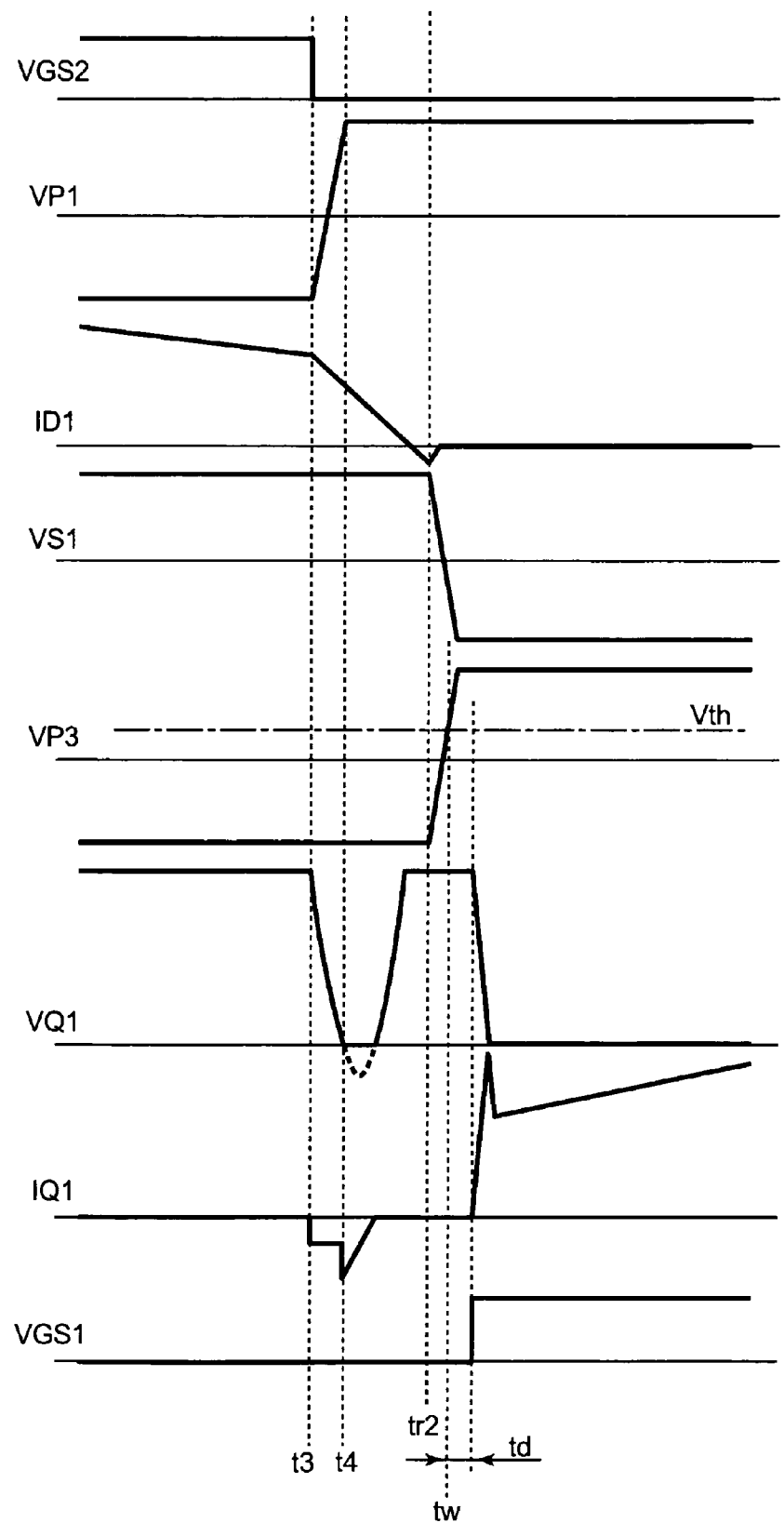
FIG. 18 is a waveform diagram that explains a problem with the second aspect of the prior art.

That is, when settings are made such that under a heavy load the switching element Q2 turns off after the current flowing in the rectifying diode D1 becomes zero, in the interval from times t4 to t1 the current waveform of the switching element Q1 is a triangular waveform, as shown in the waveform diagram of FIG. 16, and the peak current at turn-off is larger, so that the effective current value is also larger. According to this fourth aspect of the invention, as shown in FIG. 9, in the interval from time t4 to t1 the current waveform of the switching element Q1 is trapezoidal, the peak current at turn-off is reduced, and the effective current value is also smaller. At the time of reverse recovery of the rectifying diode D1, the current decrease rate increases, so that reverse-recovery losses increase somewhat but the effect in reducing losses accompanying reduced turnoff current of switching element Q1 is greater, and the net effect is reduced losses.

Further, settings can be made such that even under light loading, the switching element Q2 turns off before the current flowing in rectifying diode D1 becomes zero; but under light loading, the peak of the current flowing in switching element Q1 is small, so that the increase in reverse-recovery losses can no longer be neglected.

Hence under light loading when the current flowing in switching element Q1 is small, switching element Q2 is turned off after the current of rectifying diode D1 becomes zero such that there is almost no occurrence of reverse-recovery losses, and under heavy loading when the current flowing in switching element Q1 is large, switching element Q2 is turned off before the current of rectifying diode D1 becomes zero, so that low-loss operation is possible over the range from light loads to heavy loads.

Next, still another aspect of the invention is explained, referring to the above FIG. 4 and FIG. 7.

That is, by using the first auxiliary windings P3 in FIG. 4 and FIG. 7 as the power supply (Vcc) of the first control circuit 1 by means of on/off control of switching element Q1 and a rectifying and smoothing circuit including a diode D3 and capacitor Cd, the increase in the number of windings can be reduced, and the windings can be simplified.

Next, an aspect of the invention based on claim 6 is explained. F*ig.* 10 shows the construction of an isolation transformer representing this aspect of the invention.

Figure 12:
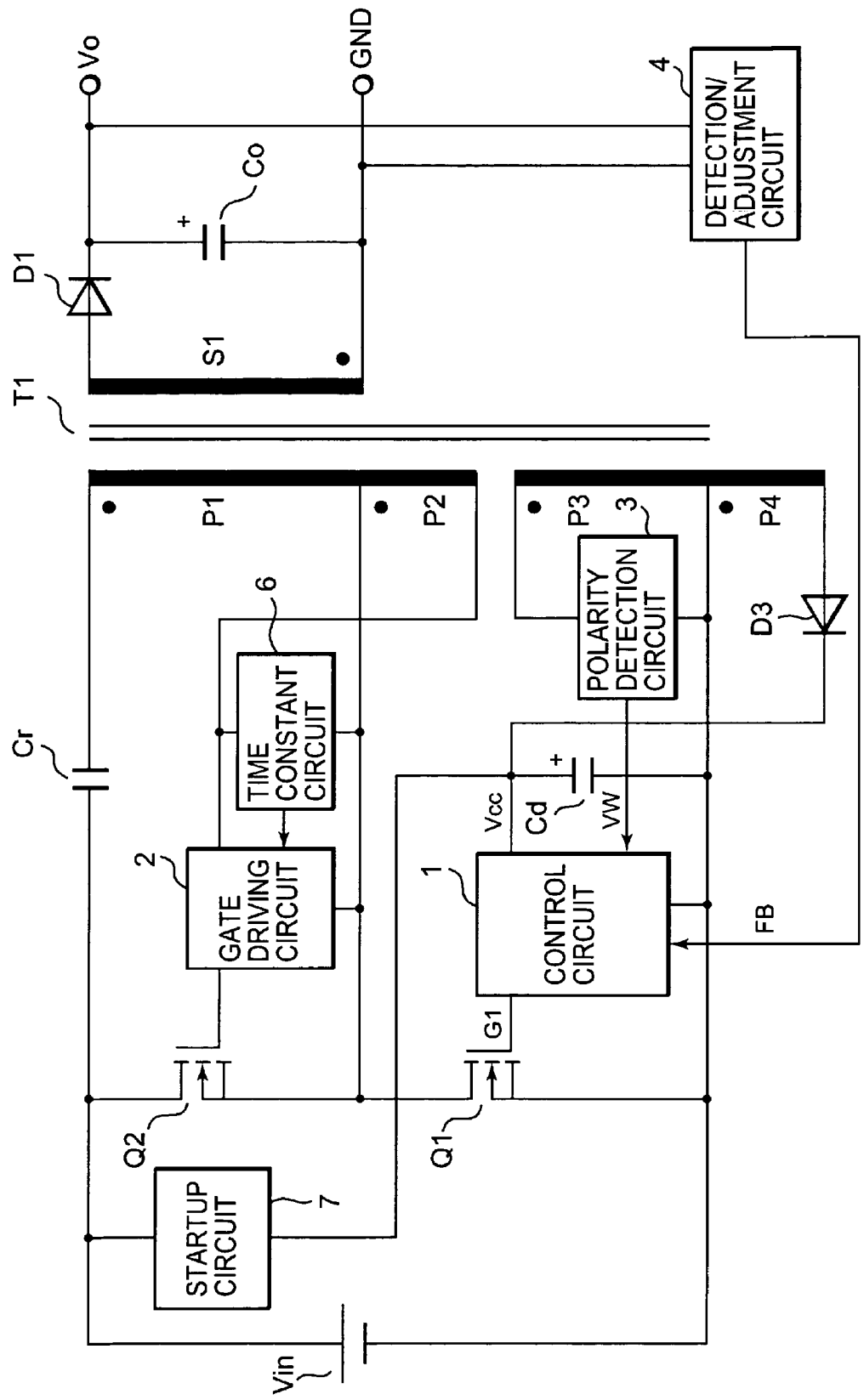
FIG. 12 is a circuit configuration diagram for the case of third auxiliary windings.
Figure 13:
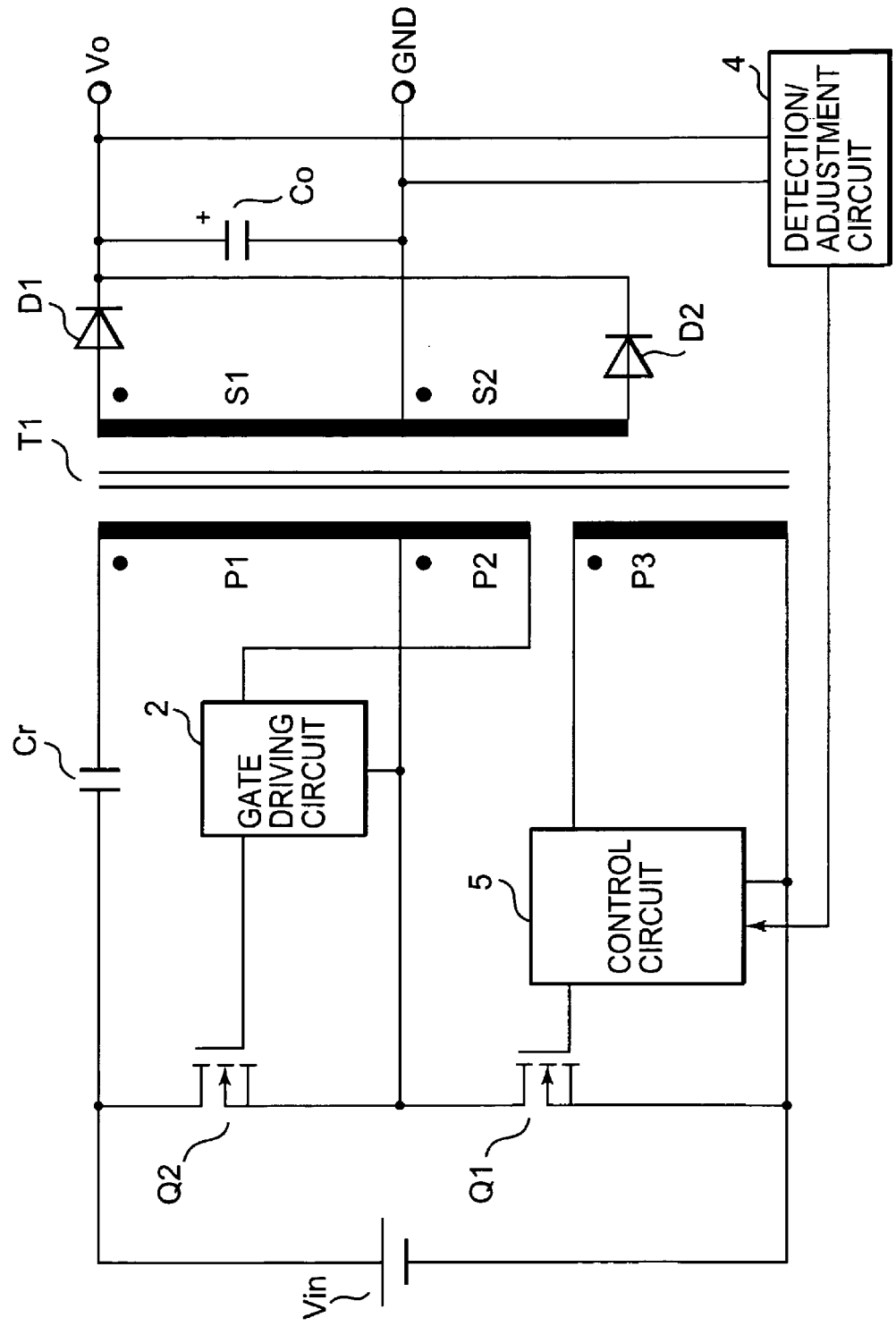
FIG. 13 is a circuit diagram showing a first aspect of the prior art.
Figure 14:
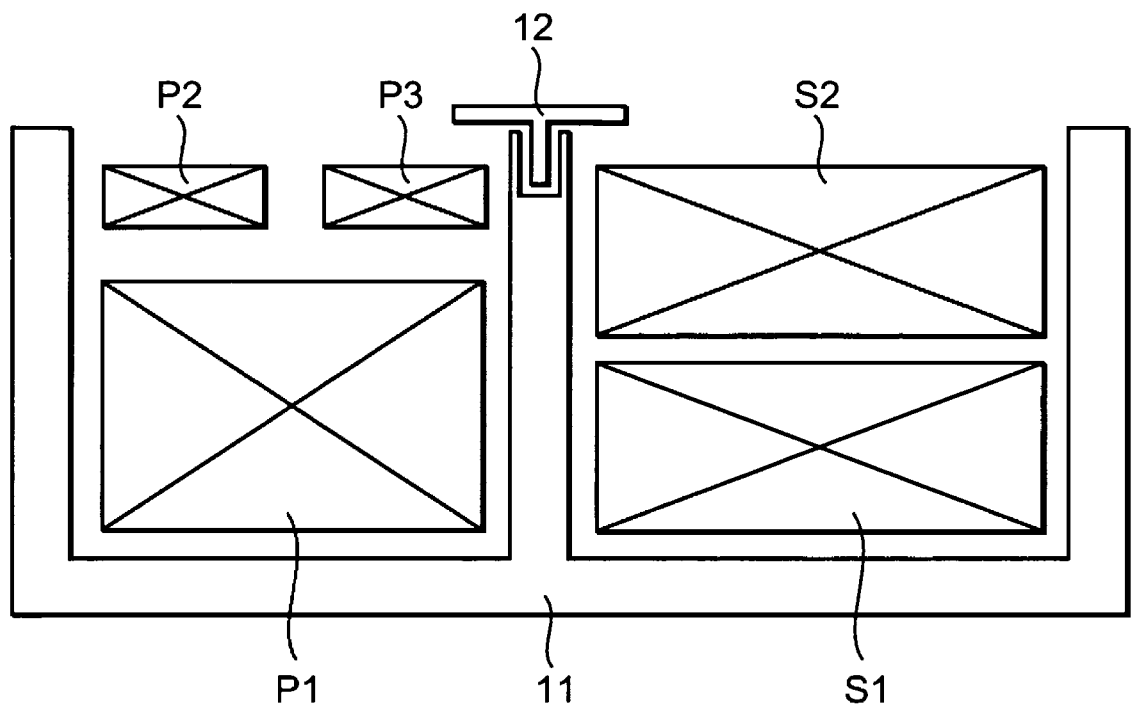
FIG. 14 is a winding construction diagram of an isolation transformer of the prior art, applied to the circuit of FIG. 13.

That is, a configuration is employed in which first and second auxiliary windings P3, P2, primary windings P1, secondary windings S1, and third auxiliary windings P4 are wound, in this order, on a bobbin 11. Then, as shown in FIG. 12, a rectifying and smoothing circuit including a diode D3 and capacitor Cd is connected to the third auxiliary windings P4, and used as the power supply of a control circuit 1.

The third auxiliary windings have a high degree of coupling with the secondary windings, and so the power supply of the first control circuit can have a voltage which is substantially proportional to the secondary-side output voltage, and regardless of the input voltage and loading state, a stabilized voltage can be obtained; hence means for dealing with overvoltages of the control power supply can be eliminated, and the costs of the switching power supply device can be lowered.

Figure 10:
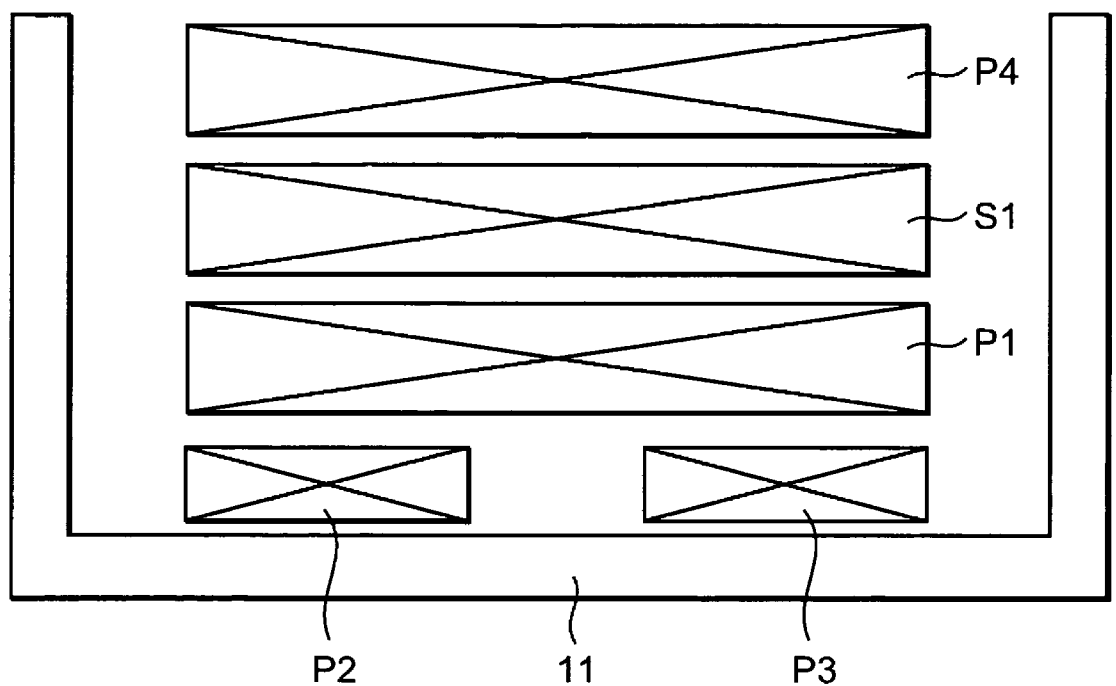
FIG. 10 is a winding construction diagram of an isolation transformer, showing still another aspect of the invention.
Figure 11:
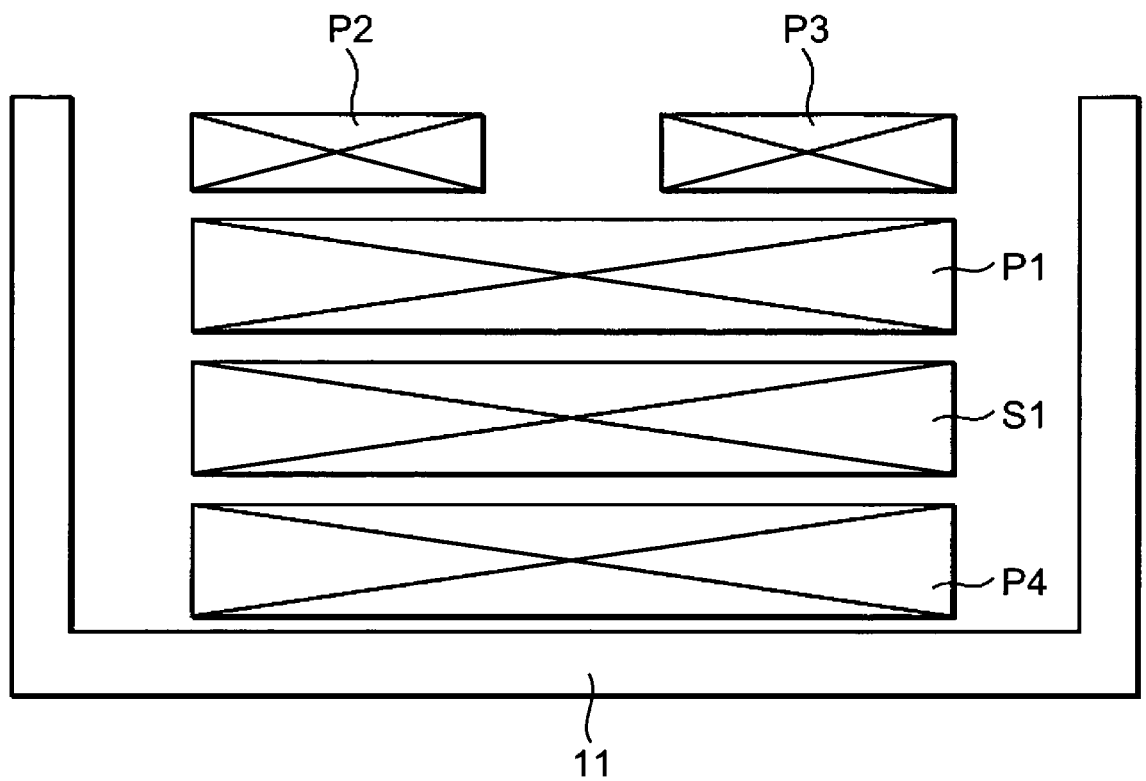
FIG. 11 is a winding construction diagram of an isolation transformer, showing a modified example of FIG. 10.

As shown in FIG. 11, the order of the windings may be the opposite of that in FIG. 10, with similar advantageous results obtained. While the invention has been particularly shown and described with reference to preferred embodiments thereof, it will be understood by those skilled in the art that the foregoing and other changes in form and details can be made therein without departing from the spirit and scope of the invention.

What is claimed is:

1. A switching power supply device for use with a DC power supply, comprising:
    a first series circuit of a first switching element and a second switching element connected in parallel with the DC power supply;
    an isolation transformer having primary and secondary windings and first and second auxiliary windings, a wound layer including the primary windings being provided in a first layer between a second layer including the first auxiliary windings and second auxiliary windings, and a third layer including substantially all of the secondary windings;
    a capacitor connected in series with the isolation transformer primary windings to define a second series circuit, the second series circuit being connected in parallel with the second switching element;
    a rectifying and smoothing circuit, including a rectifying diode and a smoothing capacitor, connected to the secondary windings of the isolation transformer;
    a first control circuit configured to turn on and off the first switching element based on a voltage generated in the first auxiliary windings; and
    a second control circuit configured to turn on and off the second switching element respectively as the first control circuit turns off and on the first switching element, based on a voltage generated in the second auxiliary windings, whereby the first and second switching elements alternately turn on and off, the rectifying and smoothing circuit providing a DC output in response thereto,
    wherein the first auxiliary windings are disposed over a first portion of the primary windings and the second auxiliary windings are disposed over a second portion of the primary windings, so that the first and second auxiliary windings do not overlap one another, or the first auxiliary windings are disposed under a first portion of the primary windings and the second auxiliary windings are disposed under a second portion of the primary windings, so that the first and second auxiliary windings do not overlap one another.

2. The switching power supply device according to claim 1, further comprising another rectifying and smoothing circuit that rectifies and smoothes the voltage generated in the first auxiliary windings to provide a control power supply for the first control circuit.

3. The switching power supply device according to any one of claim 1, further comprising:
    third auxiliary windings in a fourth layer in the isolation transformer, the third layer including the secondary windings being provided between the first layer including the primary windings and the fourth layer including the third auxiliary windings, and another rectifying and smoothing circuit that rectifies and smoothes the voltage generated in the third auxiliary windings to provide a control power supply for the first control circuit.

4. The switching power supply device according to claim 1, wherein the second control circuit includes:
a second gate driving circuit that turns on and off the second switching element, and
a time constant circuit, which sets a maximum on time of the second switching circuit,
wherein the second gate driving circuit turns on the second switching element after a prescribed delay time following a change in the voltage generated in the second auxiliary windings from negative to positive, and turns off the first switching element at the earlier time as between a time when the second auxiliary windings voltage switches from positive to negative and a time after a maximum on time of the second switching element has elapsed.

5. The switching power supply device according to claim 4, further comprising another rectifying and smoothing circuit that rectifies and smoothes the voltage generated in the first auxiliary windings to provide a control power supply for the first control circuit.

6. The switching power supply device according to claim 4, further comprising:
third auxiliary windings in a fourth layer in the isolation transformer, the third layer including the secondary windings being provided between the first layer including the primary windings and the fourth layer including the third auxiliary windings, and
another rectifying and smoothing circuit that rectifies and smoothes the voltage generated in the third auxiliary windings to provide a control power supply for the first control circuit.

7. The switching power supply device according to claim 4, wherein the maximum on time and an excitation inductance value of the isolation transformer are set such that the second switching element turns off after current flowing in the rectifying diode becomes zero, if a load connected to the DC output is a light load, and the second switching element turns off before current flowing in the rectifying diode becomes zero if the load is a heavy load.

8. The switching power supply device according to claim 7, further comprising another rectifying and smoothing circuit that rectifies and smoothes the voltage generated in the first auxiliary windings to provide a control power supply for the first control circuit.

9. The switching power supply device according to claim 7, further comprising:
third auxiliary windings in a fourth layer in the isolation transformer, the third layer including the secondary windings being provided between the first layer including the primary windings and the fourth layer including the third auxiliary windings, and
another rectifying and smoothing circuit that rectifies and smoothes the voltage generated in the third auxiliary windings to provide a control power supply of the first control circuit.

10. A switching power supply device for use with a DC power supply, comprising:
a first series circuit of a first switching element and a second switching element connected in parallel with the DC power supply;
an isolation transformer having primary and secondary windings and first and second auxiliary windings, a wound layer including the primary windings being provided in a first layer between a second layer including the first auxiliary windings and second auxiliary windings, and a third layer including substantially all of the secondary windings;
a capacitor connected in series with the isolation transformer primary windings to define a second series circuit, the second series circuit being connected in parallel with the second switching element;
a rectifying and smoothing circuit, including a rectifying diode and a smoothing capacitor, connected to the secondary windings of the isolation transformer;
a first control circuit configured to turn on and off the first switching element based on a voltage generated in the first auxiliary windings; and
a second control circuit configured to turn on and off the second switching element respectively as the first control circuit turns off and on the first switching element, based on a voltage generated in the second auxiliary windings, whereby the first and second switching elements alternately turn on and off, the rectifying and smoothing circuit providing a DC output in response thereto,
wherein the first control circuit includes
a feedback circuit configured to maintain the voltage of the DC output constant,
a triangular wave generation circuit,
a voltage polarity detector configured to detect the polarity of the voltage generated in the first auxiliary windings,
a first gate driving circuit configured to turn on and off the first switching element, and
a startup pulse generation circuit, and
wherein the first gate driving circuit turns on the first switching element after a prescribed delay time following a change in the voltage generated in the first auxiliary windings from negative to positive, and turns off the first switching element at the earlier time of a time when an output signal value of the triangular wave generation circuit exceeds a feedback signal value output from the feedback circuit and a time when the voltage generated in the first auxiliary windings changes from positive to negative.

11. The switching power supply device according to claim 10, further comprising another rectifying and smoothing circuit that rectifies and smoothes the voltage generated in the first auxiliary windings to provide a control power supply for the first control circuit.

12. The switching power supply device according to claim 10, further comprising third auxiliary windings in a fourth layer in the isolation transformer, the third layer including the secondary windings being provided between the first layer including the primary windings and the fourth layer including the third auxiliary windings, and
another rectifying and smoothing circuit that rectifies and smoothes the voltage generated in the third auxiliary windings to provide a control power supply for the first control circuit.

13. The switching power supply device according to claim 10, wherein the second control circuit includes
a second gate driving circuit that turns on and off the second switching element, and
a time constant circuit, which sets a maximum on time of the second switching circuit,
wherein the second gate driving circuit turns on the second switching element after a prescribed delay time following a change in the voltage generated in the second auxiliary windings from negative to positive, and turns off the first switching element at the earlier of a time when the second auxiliary windings voltage switches from positive to negative and a time after a maximum on time of the second switching element has elapsed.

14. The switching power supply device according to claim 13, further comprising another rectifying and smoothing circuit that rectifies and smoothes the voltage generated in the first auxiliary windings to provide a control power supply for the first control circuit.

15. The switching power supply device according to claim 13, further comprising:
   third auxiliary windings in a fourth layer in the isolation transformer, the third layer including the secondary windings being provided between the first layer including the primary windings and the fourth layer including the third auxiliary windings, and
   another rectifying and smoothing circuit that rectifies and smoothes the voltage generated in the third auxiliary windings to provide a control power supply for the first control circuit.

16. The switching power supply device according to claim 13, wherein the maximum on time and an excitation inductance value of the isolation transformer are set such that the second switching element turns off after current flowing in the rectifying diode becomes zero, if a load connected to the DC output is a light load, and the second switching element turns off before current flowing in the rectifying diode becomes zero if the load is a heavy load.

17. The switching power supply device according to claim 16, further comprising another rectifying and smoothing circuit that rectifies and smoothes the voltage generated in the first auxiliary windings to provide a control power supply for the first control circuit.

18. The switching power supply device according to claim 16, further comprising:
   third auxiliary windings in a fourth layer in the isolation transformer, the third layer including the secondary windings being provided between the first layer including the primary windings and the fourth layer including the third auxiliary windings, and
   another rectifying and smoothing circuit that rectifies and smoothes the voltage generated in the third auxiliary windings to provide a control power supply for the first control circuit.

* * * * *